United States Patent
Yang et al.

(10) Patent No.: US 9,480,050 B2
(45) Date of Patent: Oct. 25, 2016

(54) METHOD FOR CONFIGURING RESOURCE FOR CARRIER AGGREGATION AND APPARATUS FOR SAME

(75) Inventors: Suckchel Yang, Anyang-si (KR);
Mingyu Kim, Anyang-si (KR);
Joonkui Ahn, Anyang-si (KR);
Dongyoun Seo, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 171 days.

(21) Appl. No.: 14/114,126

(22) PCT Filed: Apr. 23, 2012

(86) PCT No.: PCT/KR2012/003111
§ 371 (c)(1),
(2), (4) Date: Jan. 8, 2014

(87) PCT Pub. No.: WO2012/148141
PCT Pub. Date: Nov. 1, 2012

(65) Prior Publication Data
US 2014/0112277 A1 Apr. 24, 2014

Related U.S. Application Data

(60) Provisional application No. 61/478,557, filed on Apr. 25, 2011.

(51) Int. Cl.
*H04W 72/04* (2009.01)
*H04L 5/00* (2006.01)
*H04L 27/26* (2006.01)

(52) U.S. Cl.
CPC .............. *H04W 72/04* (2013.01); *H04L 5/001* (2013.01); *H04L 5/0094* (2013.01); *H04L 5/0051* (2013.01); *H04L 27/2636* (2013.01)

(58) Field of Classification Search
None
See application file for complete search history.

(56) References Cited

U.S. PATENT DOCUMENTS

| | | | |
|---|---|---|---|
| 2011/0034175 A1* | 2/2011 | Fong et al. | 455/450 |
| 2011/0194551 A1* | 8/2011 | Lee et al. | 370/342 |
| 2011/0201367 A1* | 8/2011 | Aminaka | H04W 72/02 455/501 |
| 2012/0076115 A1 | 3/2012 | Noh et al. | |
| 2012/0257513 A1* | 10/2012 | Yamada | 370/248 |
| 2012/0314635 A1 | 12/2012 | Lee et al. | |

(Continued)

FOREIGN PATENT DOCUMENTS

| KR | 10-2010-0123656 A | 11/2010 |
|---|---|---|
| KR | 10-2010-0131912 A | 12/2010 |

(Continued)

*Primary Examiner* — Huy D Vu
*Assistant Examiner* — James P Duffy
(74) *Attorney, Agent, or Firm* — Birch, Stewart, Kolasch & Birch, LLP

(57) ABSTRACT

The present invention relates to a wireless communication system. More particularly, the present invention related to a method for performing communication on a specific single secondary cell (SCell) in a wireless communication system supporting carrier aggregation and to an apparatus for same, wherein the method comprises the following steps: receiving setting information on a plurality of frequency zones comprising the specific single SCell, wherein the plurality of frequency zones include at least one available frequency zone and at least zone unavailable frequency zone; and performing the communication from the specific single SCell, wherein a signal for the communication is transmitted and received only within the at least one available frequency from the specific single SCell.

10 Claims, 18 Drawing Sheets

(56) References Cited

U.S. PATENT DOCUMENTS

2013/0039311 A1 2/2013 Yang et al.
2014/0044000 A1* 2/2014 Charbit et al. ............... 370/252

FOREIGN PATENT DOCUMENTS

| KR | 10-2011-0018825 A | 2/2011 |
| WO | WO 2011/040791 A2 | 4/2011 |

* cited by examiner

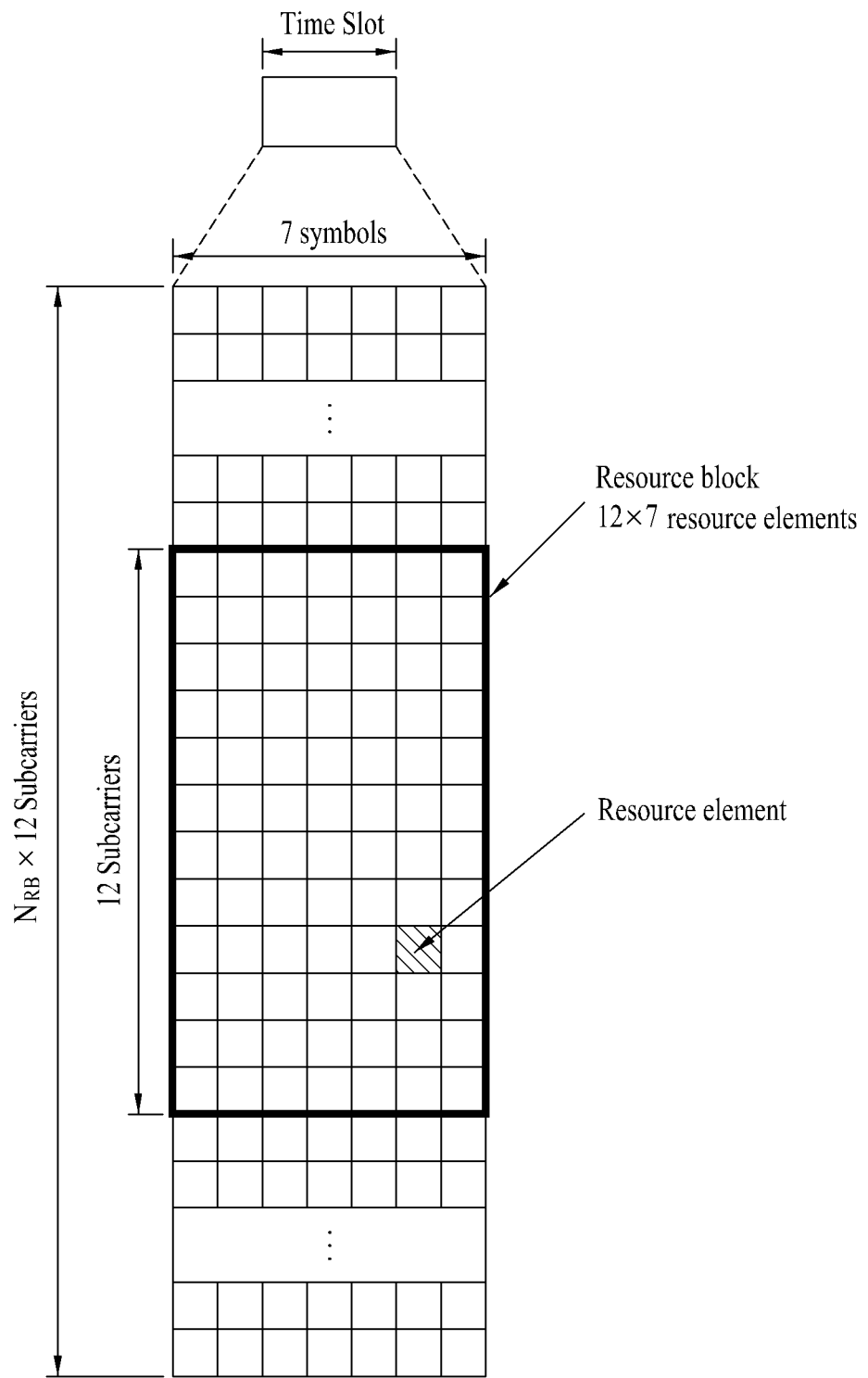

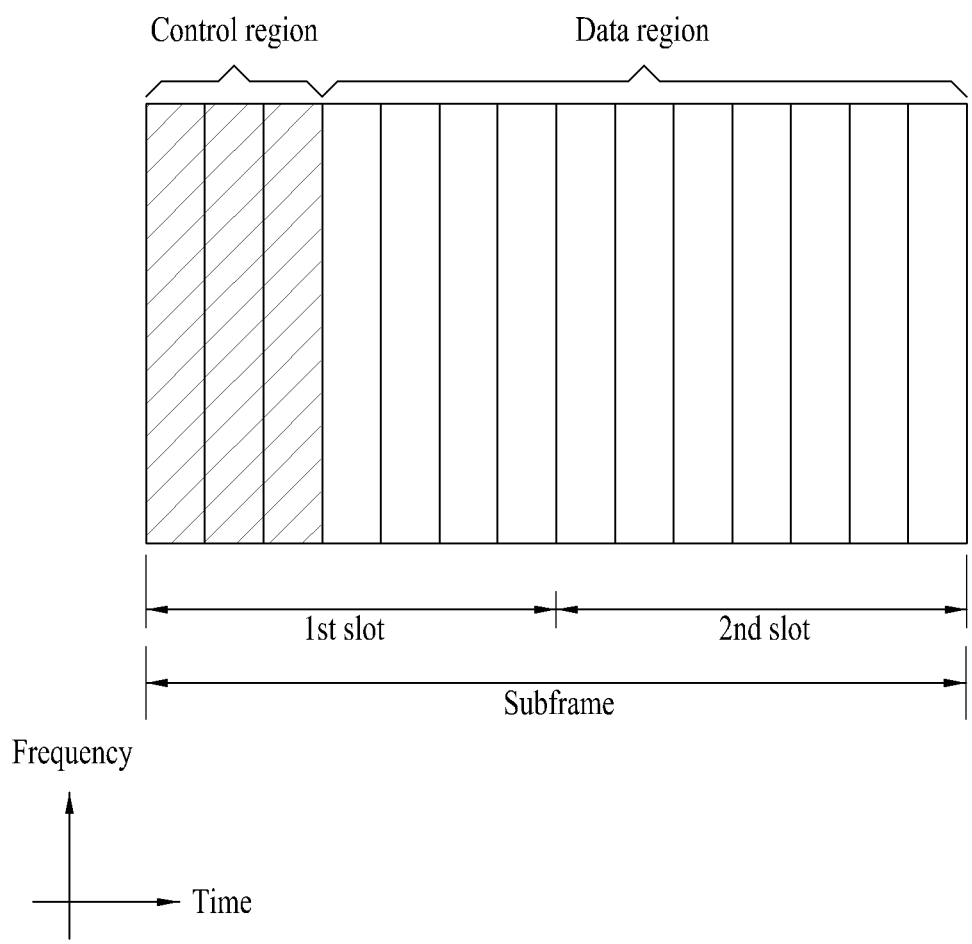

→ Licensed band for a system (Available (A)-zone)

⇠--→ Unlicensed band or licensed band for another system (e.g., TV white space band)
(White (W)-zone or Black (B)-zone)

→ frequency

A-zone: A-zone or W-zone
NA-zone: B-zone

METHOD FOR CONFIGURING RESOURCE FOR CARRIER AGGREGATION AND APPARATUS FOR SAME

CROSS REFERENCE TO RELATED APPLICATIONS

This application is the National Phase of PCT/KR2012/003111 filed on Apr. 23, 2012, which claims priority under 35 U.S.C.§119(e) to U.S. Provisional Application No. 61/478,557 filed on Apr. 25, 2011, all of which are hereby expressly incorporated by reference into the present application.

TECHNICAL FIELD

The present invention relates to a wireless communication system, and more particularly, to a communication method and device for configuring resource for carrier aggregation.

BACKGROUND ART

Wireless communication systems have been diversified in order to provide various types of communication services such as voice or data service. In general, a wireless communication system is a multiple access system capable of sharing available system resources (bandwidth, transmit power or the like) so as to support communication with multiple users. Examples of the multiple access system include a Code Division Multiple Access (CDMA) system, a Frequency Division Multiple Access (FDMA) system, a Time Division Multiple Access (TDMA) system, an Orthogonal Frequency Division Multiple Access (OFDMA) system, a Single Carrier Frequency Division Multiple Access (SC-FDMA) system, a Multi Carrier Frequency Division Multiple Access (MC-FDMA) system and the like.

DISCLOSURE

Technical Problem

An object of the present invention devised to solve the problem lies in a method and device for efficiently configuring resource in a wireless communication system. Another object of the present invention is to provide a method and device for configuring frequency resources in a carrier aggregation system and for efficiently performing communication.

The technical problems solved by the present invention are not limited to the above technical problems and those skilled in the art may understand other technical problems from the following description.

Technical Solution

The object of the present invention can be achieved by providing a method of controlling inter-cell interference at a serving cell in a time division duplex (TDD) wireless communication system, including transmitting subframe allocation information indicating one or more uplink (UL) subframes to a neighboring cell, and restricting UL transmission activity in the one or more UL subframes.

In another aspect of the present invention, provided herein is a base station configured to control inter-cell interference in a time division duplex (TDD) wireless communication system, including a radio frequency (RF) unit, and a processor, wherein the processor transmits subframe allocation information indicating one or more uplink (UL) subframes to a neighboring cell and restricts UL transmission activity in the one or more UL subframes.

Radio frames of the serving cell and the neighboring cell may have different uplink-downlink (UL-DL) configurations, and the one or more UL subframes may collide with a downlink (DL) subframe of the neighboring cell.

The subframe allocation information may include a bitmap used to indicate a DL almost blank subframe (ABS) pattern and one or more bits corresponding to one or more UL subframes in the bitmap may be set to predetermined values.

The restricting the UL transmission activity may include restricting UL scheduling to a predetermined user equipment (UE) of the serving cell.

The method may further include receiving information indicating the predetermined UE from the neighboring cell.

The predetermined UE may be determined based on a UL measurement value generated by a UE of the neighboring cell and the UL measurement value may be a measurement value of a UL signal transmitted from a UE located within the serving cell.

The UL signal may include a sounding reference signal (SRS).

Advantageous Effects

According to the present invention, it is possible to efficiently configure resources in a wireless communication system. In addition, it is possible to configure frequency resources and to perform communication in a carrier communication system.

The effects of the present invention are not limited to the above-described effects and other effects which are not described herein will become apparent to those skilled in the art from the following description.

DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 3 is a diagram showing a resource grid of a downlink slot;

FIG. 4 is a diagram showing the structure of a downlink frame;

BEST MODE

The following embodiments of the present invention may be utilized in various radio access systems such as a Code Division Multiple Access (CDMA) system, a Frequency Division Multiple Access (FDMA) system, a Time Division Multiple Access (TDMA) system, an Orthogonal Frequency Division Multiple Access (OFDMA) system, a Single Carrier Frequency Division Multiple Access (SC-FDMA) system, or a Multi Carrier Frequency Division Multiple Access (MC-FDMA) system. CDMA may be implemented as radio technology such as Universal Terrestrial Radio Access (UTRA) or CDMA2000. TDMA may be implemented as radio technology such as Global System for Mobile communications (GSM)/General Packet Radio Service (GPRS)/Enhanced Data Rates for GSM Evolution (EDGE). OFDMA may be implemented as radio technology such as IEEE 802.11 (Wi-Fi), IEEE 802.16 (WiMAX), IEEE 802-20 or E-UTRA (Evolved UTRA). UTRA is part of the Universal Mobile Telecommunications System (UMTS). A $3^{rd}$ Generation Partnership Project Long Term Evolution (3GPP LTE) communication system is part of the E-UMTS (Evolved. UMTS) which employs the E-UTRA. The LTE-Advanced (LTE-A) is an evolved version of the 3GPP LTE. For clarity, the following description focuses on the 3GPP LTE and LTE-A system. However, the technical spirit of the present invention is not limited thereto.

Figure 1:
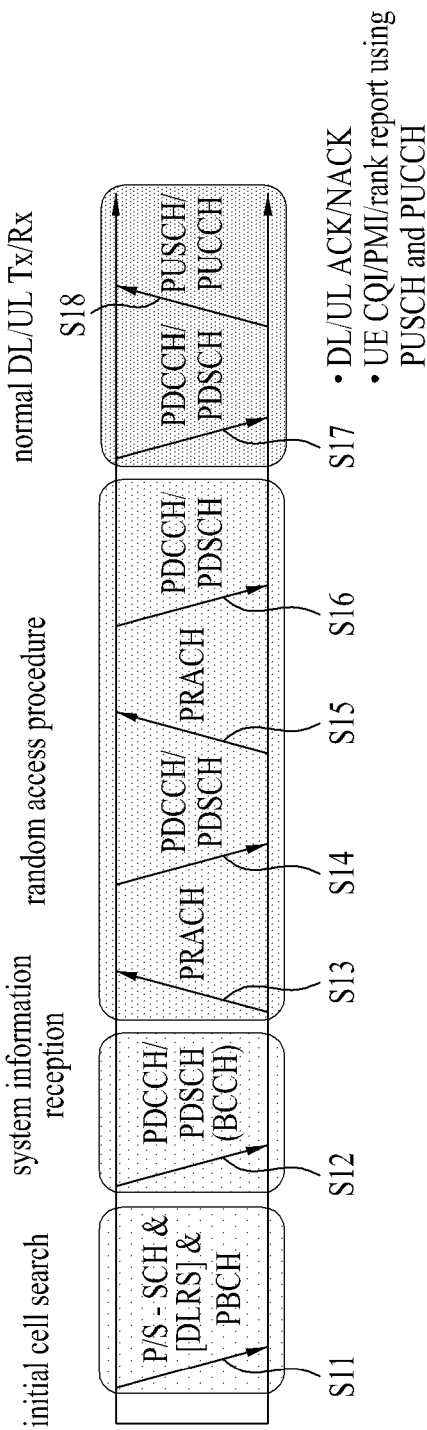
FIG. 1 is a diagram showing physical channels used in a 3$^{rd}$ Generation Partnership Project (3GPP) system as an example of a wireless communication system and a general signal transmission method using the same.

FIG. 1 is a diagram showing physical channels used in a $3^{rd}$ Generation Partnership Project (3GPP) Long Term Evolution (LTE) system and a general signal transmission method using the same.

Referring to FIG. 1, a UE performs an initial cell search operation such as synchronization with an eNB in step S101, when power is turned on or the UE enters a new cell. The UE may receive a Primary Synchronization Channel (P-SCH) and a Secondary Synchronization Channel (S-SCH) from the eNB, perform synchronization with the eNB, and acquire information such as a cell ID. Thereafter, the UE may receive a physical broadcast channel from the eNB so as to acquire broadcast information within the cell. Meanwhile, the UE may receive a Downlink Reference Signal (DL RS) so as to confirm a downlink channel state in the initial cell search step.

The UE which has completed the initial cell search may receive a Physical Downlink Control Channel (PDCCH) and a Physical Downlink Shared Channel (PDSCH) according to information about the PDCCH so as to acquire more detailed system information, in step S102.

Meanwhile, the UE may perform a Random Access Procedure (RACH) in steps S103 to S106, for connection to the eNB. In this case, the UE may transmit a preamble through a Physical Random Access Channel (PRACH) (S103), and receive a response message to the preamble through the PDCCH and the PDSCH corresponding thereto (S104). In contention-based random access, a contention resolution procedure including transmission of an additional PRACH (S105) and reception of the PDCCH and the PDSCH corresponding thereto (S106) may be performed.

The UE which has performed the above procedures may perform PDCCH/PDSCH reception (S107) and Physical Uplink Shared Channel PUSCH)/Physical Uplink Control Channel (PUCCH) transmission (S108) as a general uplink/downlink signal transmission procedure. Control information transmitted from the UE to the eNB is collectively referred to as uplink control information (UCI). UCI includes hybrid automatic repeat and request acknowledgement (ACK)/negative-ACK (HACK), scheduling request (SR), channel state information (CSI), etc. The CSI includes a channel quality indicator (CQI), a precoding matrix index (PMI), a rank indicator (RI), etc. The UCI may be generally transmitted via a PUCCH. However, if control information and traffic data are simultaneously transmitted, the UCI may be transmitted via a PUSCH. In addition, the UCI may be aperiodically transmitted via a PUSCH according to a network request/instruction.

Figure 2:
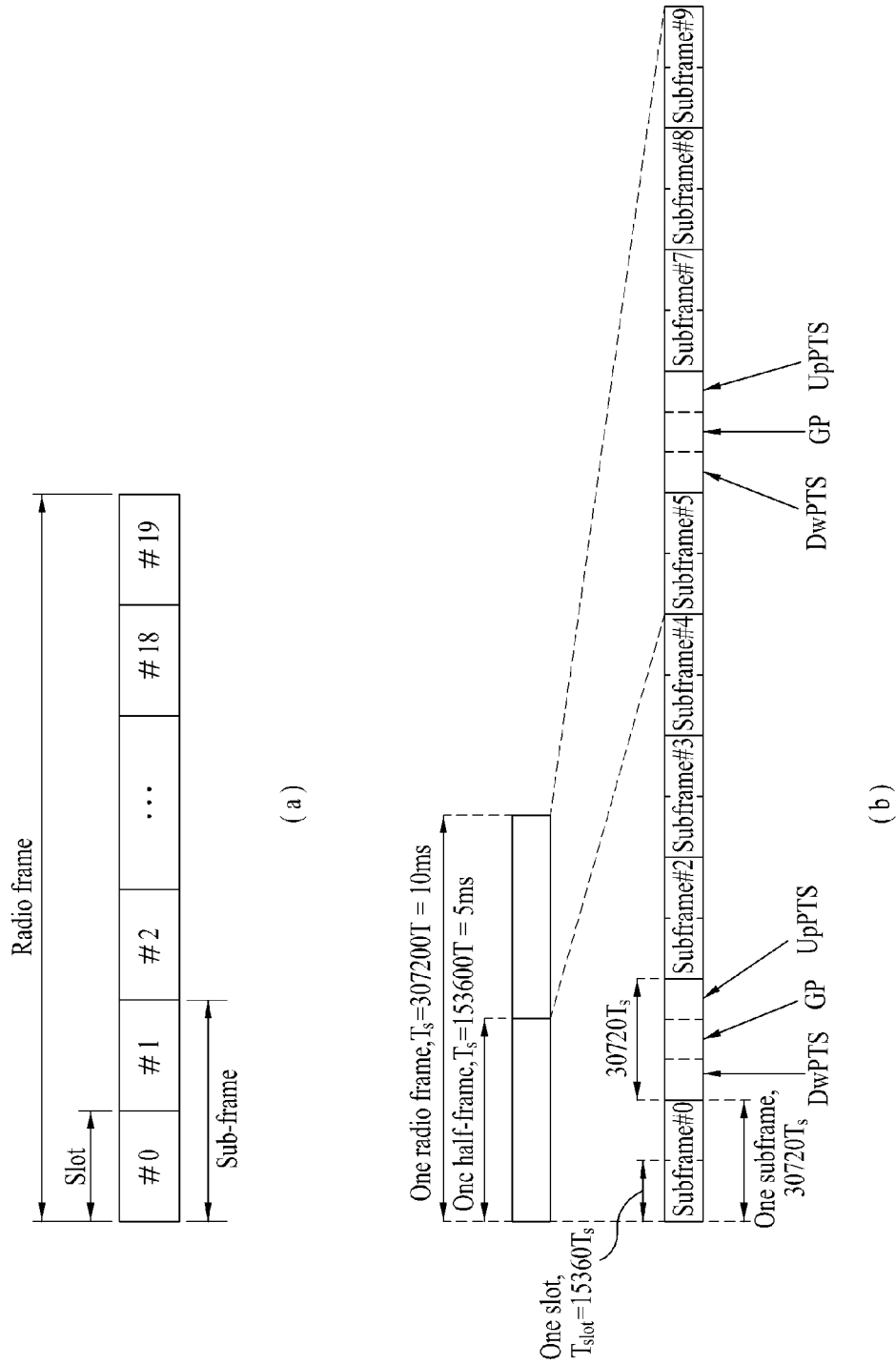
FIG. 2 is a diagram showing the structure of a radio frame.

FIG. 2 is a diagram showing the structure of a radio frame. In a cellular OFDM radio packet communication system, uplink/downlink data packet transmission is performed in subframe (SB) units and one subframe is defined as a predetermined time interval including a plurality of OFDM symbols. The 3GPP LTE standard supports a type 1 radio frame structure applicable to frequency division duplex (FDD) and a type 2 radio frame structure applicable to time division duplex (TDD).

FIG. 2(a) shows the structure of radio frame type 1. A downlink radio frame includes 10 subframes and one subframe includes two slots in a time domain. A time required to transmit one subframe is referred to as a transmission time interval (TTI). For example, the length of one subframe may be 1 ms and the length of one slot may be 0.5 ms. One slot includes a plurality of OFDM symbols in a time domain and includes a plurality of resource blocks (RBs) in a frequency domain. In a 3GPP LTE system, since OFDM is used in downlink, an OFDM symbol indicates one symbol interval. The OFDM symbol may be referred to as an SC-FDMA symbol or symbol interval. A resource block (RB) as a resource allocation unit may include a plurality of consecutive subcarriers in one slot.

The number of OFDM symbols included in one slot may be changed according to the configuration of a Cyclic Prefix (CP). The CP includes an extended CP and a normal CP. For example, if the OFDM symbols are configured by the normal CP, the number of OFDM symbols included in one slot may be seven. If the OFDM symbols are configured by the extended CP, the length of one OFDM symbol is increased, the number of OFDM symbols included in one slot is less than that of the normal CP. In case of the extended CP, for example, the number of OFDM symbols included in one slot may be six. If a channel state is unstable, for example, if a user equipment (UE) moves at a high speed, the extended CP may be used in order to further reduce inter-symbol interference.

In case of using the normal CP, since one slot includes seven OFDM symbols, one subframe includes 14 OFDM symbols. At this time, the first at most three OFDM symbols of each subframe may be allocated to a Physical Downlink Control Channel (PDCCH) and the remaining OFDM symbols may be allocated to a Physical Downlink Shared Channel (PDSCH).

FIG. 2(b) is a diagram showing the structure of the radio frame type 2. The radio frame type 2 includes two half frames, each of which includes five subframes. A subframe may be one of a downlink subframe, an uplink subframe or a special subframe. The special subframe may be used as a downlink subframe or an uplink subframe according to TDD configuration. The special subframe includes a downlink pilot time slot (DwPTS), a guard period (GP), and an uplink pilot time slot (UpPTS). The DwPTS is used for initial cell search, synchronization and channel estimation at a UE. The UpPTS is used for channel estimation at an eNB and uplink transmission synchronization of a UE. The guard period is used to remove interference occurring in uplink due to multi-path delay of a downlink signal between uplink and downlink.

The structure of the radio frame is only exemplary. Accordingly, the number of subframes included in the radio frame, the number of slots included in the subframe or the number of symbols included in the slot may be changed in various manners.

FIG. 3 is a diagram showing a resource grid of a downlink slot.

Referring to FIG. 3, a downlink slot includes a plurality of OFDM symbols in a time domain. One downlink slot may include seven (six) OFDM symbols and one RB may include 12 subcarriers in a frequency domain. Each element on the resource grid is referred to as a resource element (RE). One RB includes 12×7(6) REs. The number $N_{RB}$ of RBs included in a downlink slot depends on a downlink transmission bandwidth. The structure of the uplink slot may be equal to the structure of the downlink slot, except that an OFDM symbol is replaced with an SC-FDMA symbol.

FIG. 4 is a diagram showing the structure of a downlink subframe.

Referring to FIG. 4, a maximum of three (four) OFDM symbols of a front portion of a first slot within one subframe corresponds to a control region to which a control channel is allocated. The remaining OFDM symbols correspond to a data region to which a Physical Downlink Shared Channel (PDSCH) is allocated. The PDSCH is used to transmit a Transport Block (TB) or a CodeWord (CW) corresponding to the TB. The TB means a data block transmitted from MAC (Medium Access Control) layer to PHY (Physical) layer. The CW is a version of the TB coded. A corresponding relation between TB and CW can be changed according to swapping. The term 'PDSCH', 'TB' and 'CW' can be used together with. Examples of the downlink control channels used in LTE (-A) include, for example, a Physical Control Format Indicator Channel (PCFICH), a Physical Downlink Control Channel (PDCCH), a Physical Hybrid automatic repeat request Indicator Channel (PHICH), etc. The PCFICH is transmitted at a first OFDM symbol of a subframe, and carries information about the number of OFDM symbols used to transmit the control channel within the subframe. The PHICH carries a HARQ ACK/NACK signal in response to uplink transmission. The HARQ ACK/NACK signal includes a positive ACK (simply, ACK), negative ACK (NACK), DTX (Discontinuous Transmission) or NACK/DTX. The term 'HARQ-ACK' can be used with HARQ ACK/NACK and ACK/MACK.

The control information transmitted through the PDCCH is referred to as Downlink Control Information (DCI). The DCI includes resource allocation information and other control information for a UE or a UE group. For example, the DCI includes uplink or downlink scheduling information, an uplink transmit (Tx) power control command, etc. Transmission modes for configuring a multi-antenna technique and information contents of DCI formats are described as follows.

Transmission Mode
  Transmission Mode 1: Transmission from an antenna port of a single eNB
  Transmission Mode 2: Transmit diversity
  Transmission Mode 3: Open-loop space multiplexing
  Transmission Mode 4: Closed-loop space multiplexing
  Transmission Mode 5: multi-user MIMO
  Transmission Mode 6: Closed-loop rank-1 precoding
  Transmission Mode 7: Transmission using a UE-specific reference signal DCI Format
  Format 0: Resource grant for PUSCH transmission (uplink)
  Format 1: Resource allocation for single codeword PDSCH transmission (Transmission Modes 1, 2 and 7)
  Format 1A: Compact signaling of resource allocation for single codeword PDSCH (all modes)
  Format 1B: Compact resource allocation for PDSCH (Mode 6) using rank-1 closed-loop precoding
  Format 1C: Very compact resource allocation for a PDSCH (e.g., paging/broadcast system information)
  Format 1D: Compact resource allocation for a PDSCH (Mode 5) using multi-user MIMO
  Format 2: Resource allocation for a PDSCH (Mode 4) of a closed-loop MIMO operation
  Format 2A: Resource allocation for a PDSCH (Mode 3) of an open-loop MIMO operation
  Format 3/3a: Power control command having a 2-bit/1-bit power control value for a PUCCH and a PUSCH As described above, The PDCCH may carry transmission format and resource allocation information of a Downlink Shared Channel (DL-SCH), transmission format and resource allocation information of an Uplink Shared Channel (UL-SCH), paging information on a Paging Channel (PCH), system information on the DL-SCH, resource allocation of a higher layer control message such as a Random Access Response (RAR) transmitted on the PDSCH, a set of transmit (Tx) power control commands for individual UEs within a UE group, a Tx power control command, information indicating activation of Voice over IP (VoIP), etc. A plurality of PDCCHs may be transmitted within the control region. The UE may monitor the plurality of PDCCHs. The PDCCHs are transmitted as an aggregate of one or several consecutive control channel elements (CCEs). The CCE is a logical allocation unit used to provide the PDCCHs with a coding rate based on the state of a radio channel. The CCE corresponds to a plurality of resource element groups (REGs). The format of the PDCCH and the number of available bits are determined based on the number of CCEs. The eNB determines a PDCCH format according to a DCI to be transmitted to the UE, and attaches a Cyclic Redundancy Check (CRC) to control information. The CRC is masked with a Radio Network Temporary Identifier (RNTI) according to an owner or usage of the PDCCH. If the PDCCH is for a specific UE, a cell-RNTI (C-RNTI) of the UE may be masked to the CRC. Alternatively, if the PDCCH is for a paging message, a paging indicator identifier (P-RNTI) may be masked to the CRC. If the PDCCH is for system information (more specifically, a system information block (SIB)), a system information RNTI (SI-RNTI) may be masked to the CRC. If the PDCCH is for random access response, a random access-RNTI (RA-RNTI) may be masked to the CRC.

Figure 5A:
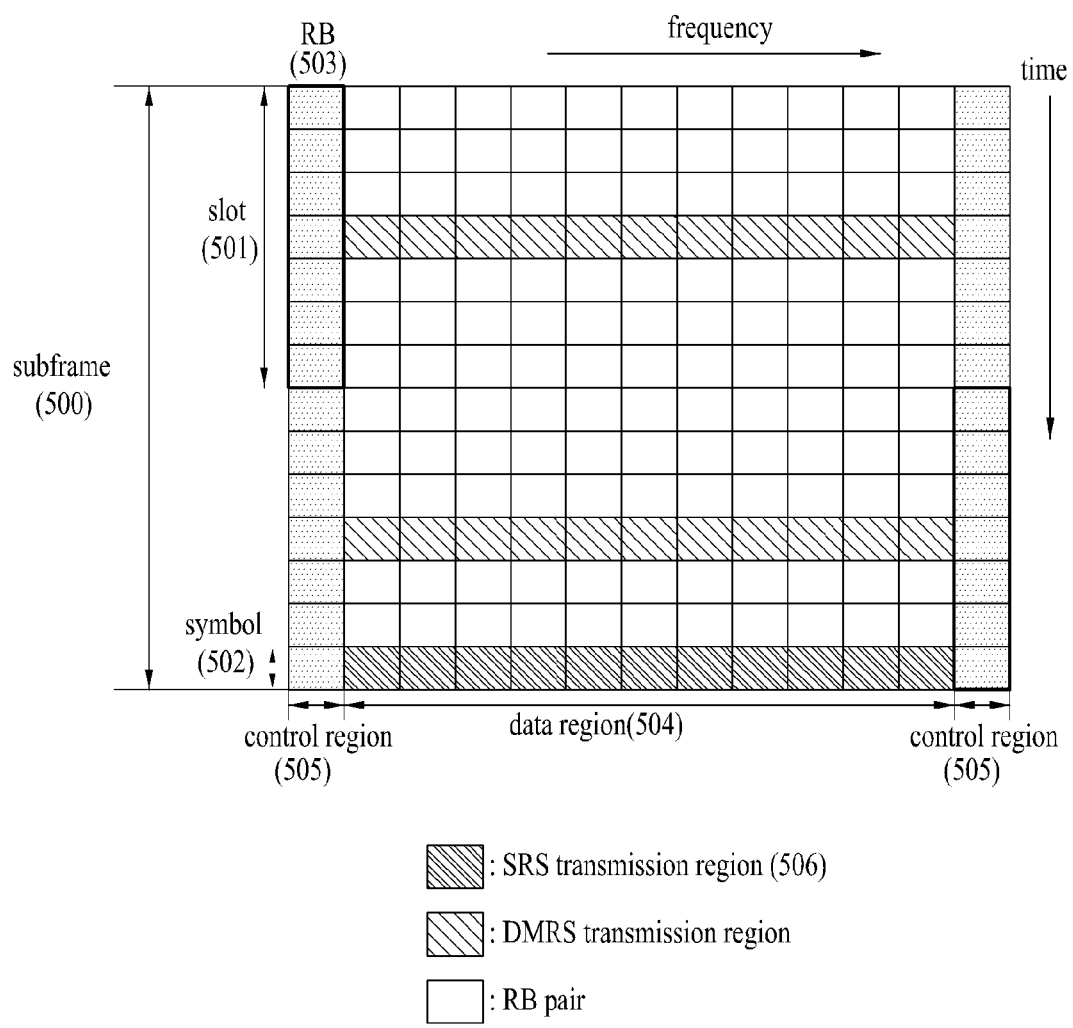
FIG. 5A is a diagram showing the structure of an uplink subframe.

FIG. 5A exemplarily shows an uplink (UL) subframe structure for use in a system.

Referring to FIG. 5A, a subframe 500 includes two 0.5 ms slots 501. Assuming a normal Cyclic Prefix (CP) is used, each slot includes 7 symbols 502 and one symbol corresponds to one SC-FDMA symbol. A resource block 503 is a resource allocation unit corresponding to 12 subcarriers in a frequency domain and one slot in a time domain. The structure of the uplink subframe is broadly divided into a data region 504 and a control region 505. The data region refers to a series of communication resources used for transmission of data such as voice and packets transmitted to each UE and includes a Physical Uplink Shared Channel (PUSCH). The control region refers to a series of communication resources used for transmission of uplink control information (UCI) by from each UE, and includes a physical uplink control channel (PUCCH).

The PUCCH can be used to transmit the following control information.

Scheduling Request (SR): This is information used to request a UL-SCH resource and is transmitted using On-Off Keying (OOK) scheme.

HARQ ACK/NACK: This is a response signal to a downlink data packet on a PDSCH and indicates whether the downlink data packet has been successfully received. A 1-bit ACK/NACK signal is transmitted as a response to a single downlink codeword and a 2-bit ACK/NACK signal is transmitted as a response to two downlink codewords. HARQ-ACK responses include positive ACK (ACK), negative ACK (HACK), discontinuous transmission (DTX) and NACK/DTX. Here, the term HARQ-ACK is used interchangeably with the term HARQ ACK/NACK and ACK/NACK.

Channel State Indicator (CSI): This is feedback information about a downlink channel. Feedback information regarding MIMO includes a rank indicator (RI) and a precoding matrix indicator (PMI). 20 bits are used per subframe.

The quantity of control information (UCI) that a UE can transmit through a subframe depends on the number of SC-FDMA symbols available for control information transmission. The SC-FDMA symbols available for control information transmission correspond to SC-FDMA symbols other than SC-FDMA symbols of the subframe, which are used for reference signal transmission. In the case of a subframe in which a sounding reference signal (SRS) is configured, the last SC-FDMA symbol of the subframe is excluded from the SC-FDMA symbols available for control information transmission. A reference signal is used to detect coherence of the PUCCH. The PUCCH supports various formats according to information transmitted thereon.

Table 1 shows the mapping relationship between PUCCH formats and UCI in LTE-A.

TABLE 1

| PUCCH format | UCI (Uplink Control Information) |
| --- | --- |
| Format 1 | SR (scheduling request) (non-modulated waveform) |
| Format 1a | 1-bit HARQ ACK/NACK (SR exist/non-exist) |
| Format 1b | 2-bit HARQ ACK/NACK (SR exist/non-exist) |

TABLE 1-continued

| PUCCH format | UCI (Uplink Control Information) |
| --- | --- |
| Format 2 | CQI (20 coded bits) |
| Format 2 | CQI and 1- or 2-bit HARQ ACK/NACK (20 bits) (corresponding to only extended CP) |
| Format 2a | CQI and 1-bit HARQ ACK/NACK (20 + 1 coded bits) |
| Format 2b | CQI and 2-bit HARQ ACK/NACK (20 + 2 coded bits) |
| Format 3 (LTE-A) | HARQ ACK/NACK + SR of a maximum of 24 bits |

Figure 5B:
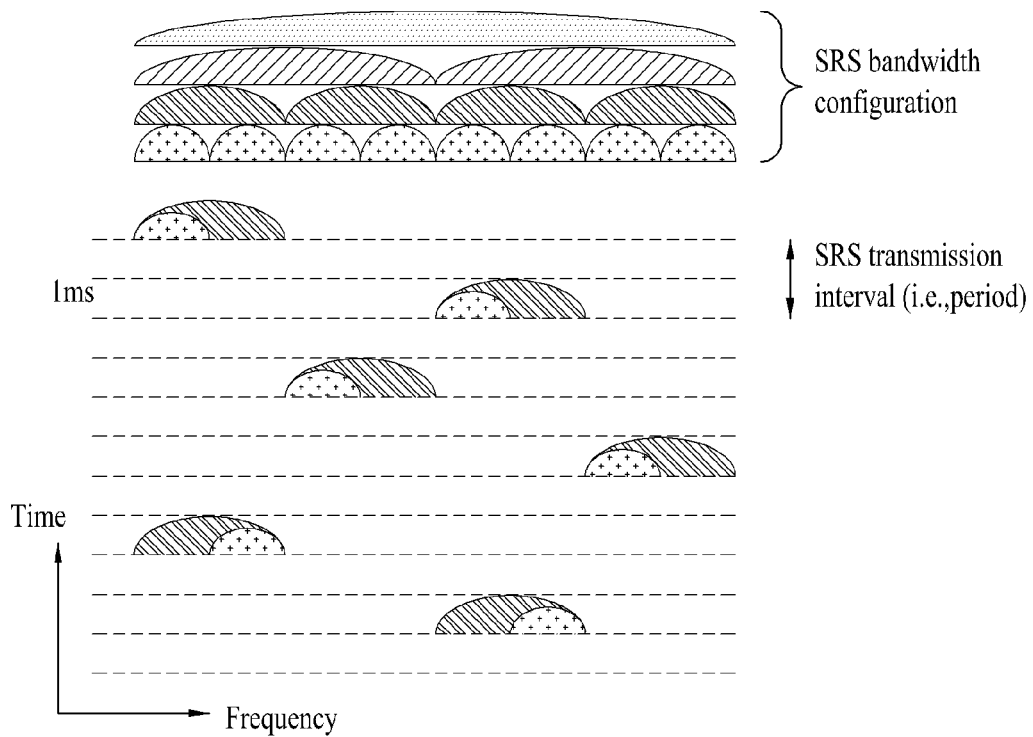
FIG. 5B is a diagram showing the SRS (Sounding Reference Signal) transmission.

SRS is transmitted through the last SC-FDMA symbol in one subframe in a time domain in step 506. SRSs of multiple UEs, which are transmitted through the same SC-FDMA symbol, and can be identified according to frequency position/sequence. SRS is aperiodically or periodically transmitted. Configuration for periodic SRS transmission is achieved by a cell-specific SRS parameter and a UE-specific SRS parameter. The cell-specific SRS parameter (in other words, cell-specific SRS configuration) and the UE-specific SRS parameter (in other words, UE-specific SRS configuration) are transmitted to a UE through higher layer (e.g. RRC) signaling. The cell-specific parameters may indicate subframes occupied for SRS transmission, and may also indicate the SRS frequency band, etc. The UE-specific SRS parameter may indicate a subframe, an SRS frequency band, and SRS hopping information, which will be actually used by the UE for SRS transmission within a predetermined range established by the cell-specific SRS parameter. FIG. 5B shows an example of SRS transmission. Referring to FIG. 5B, the UE performs SRS transmission processes (e.g., SRS sequence generation, resource allocation, resource mapping, etc.) needed for implementing SRS transmission per SRS transmission interval (i.e., SRS transmission period) (e.g., 2 ms). During SRS transmission, the frequency band for SRS transmission is hopped according to SRS band configuration and hopping information.

Figure 6:
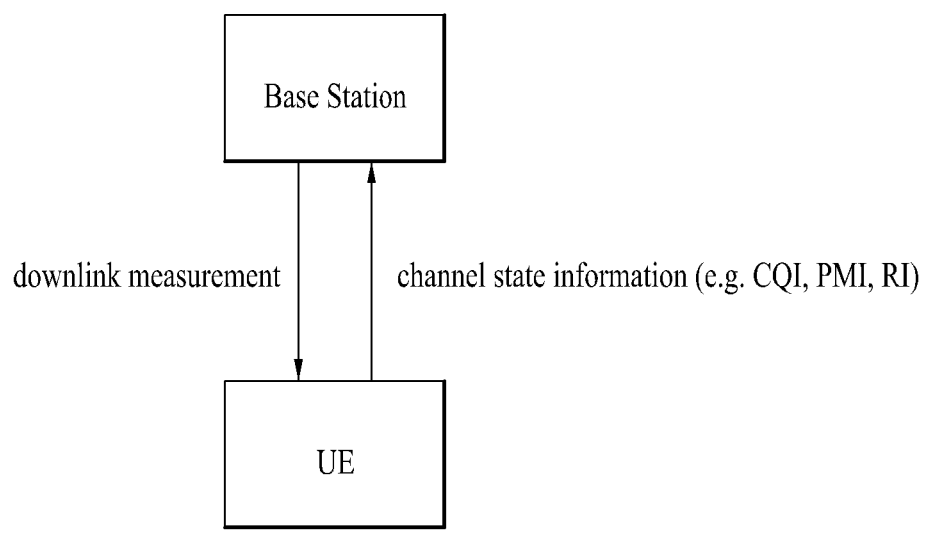
FIG. 6 is a diagram showing channel state information generation and transmission.

FIG. 6 is a conceptual diagram illustrating Channel Status Information (CSI) generation and transmission.

Referring to FIG. 6, a UE measures downlink quality using a reference signal and reports channel status information to a base station (BS). The BS performs downlink scheduling (UE selection, resource allocation, etc.) according to the reported channel status information. The channel status information includes at least one of CQI, PMI and RI. The CQI may be generated through various methods. For example, channel state (or spectral efficiency) can be quantized and signaled, an SINR can be calculated and signaled or a channel application state such as a modulation and coding scheme (MCS) can be signaled in order to generate the CQI.

In the legacy LTE, a common RS (CRS) is used for channel measurement. The CRS is used for channel information acquisition and data demodulation and transmitted per subframe. In LTE-A, a channel state information RS (CSI-RS) for channel measurement only may be used. The CSI-RS is intermittently transmitted on the time domain in order to reduce overhead. For example, the CSI-RS can be periodically transmitted at an interval of an integer multiple of a subframe or transmitted in a specific pattern. The period or pattern in which the CSI-RS is transmitted may be set by a BS.

Figure 7:
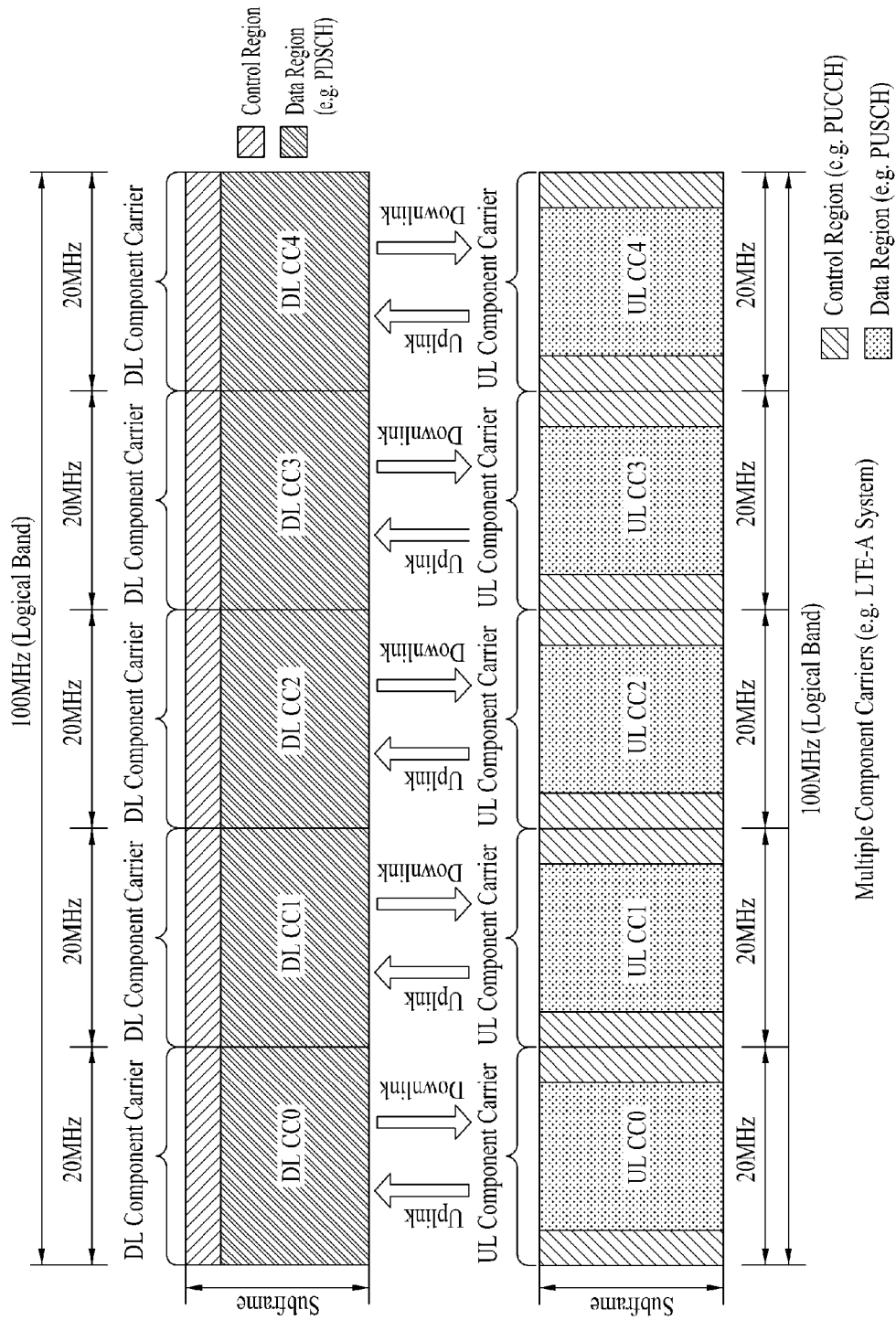
FIG. 7 is a diagram showing carrier aggregation communication system.
Figure 8:
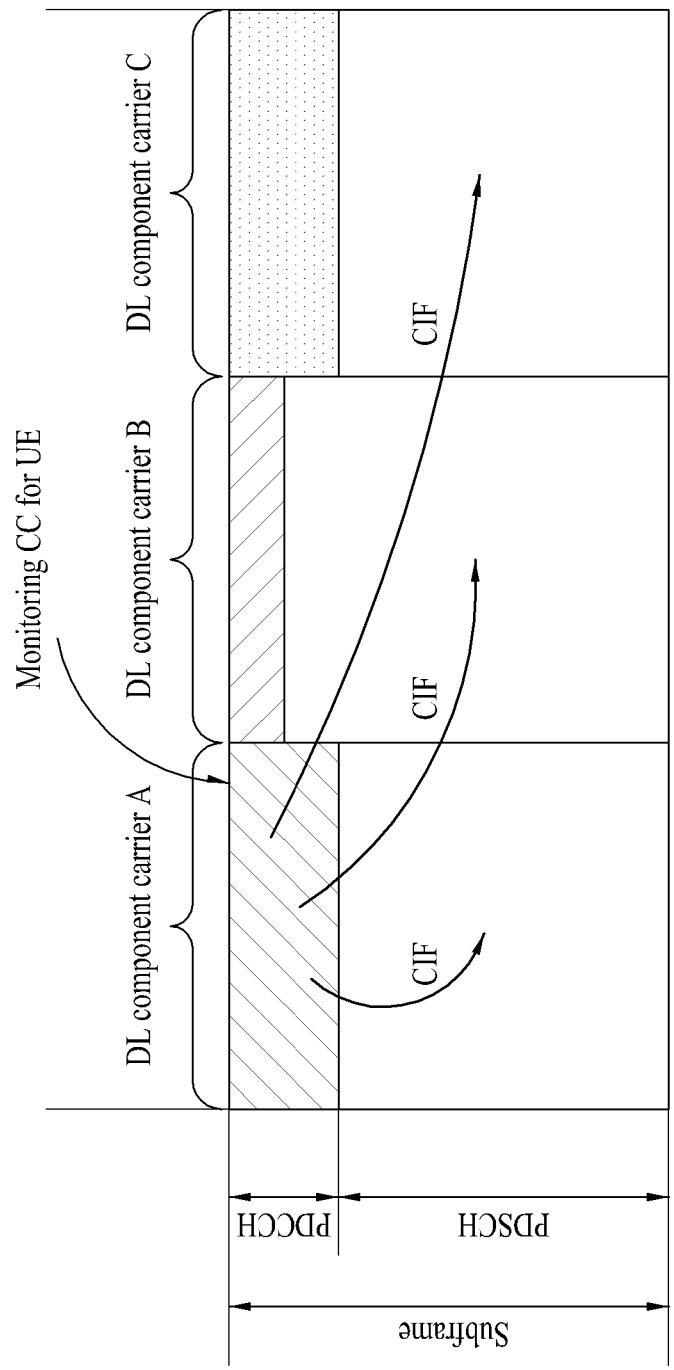
FIG. 8 is a diagram showing scheduling of a case in which a plurality of carriers are aggregated.

Referring to FIG. 7, a plurality of uplink/downlink Component Carriers (CCs) may be aggregated so as to support a wider uplink/downlink bandwidth. The CCs may be contiguous or non-contiguous in a frequency domain. The bandwidths of the CCs are independently set. Asymmetric CA in which the number of UL CCs and the number of DL CCs are different is also possible. For example, when there are 2 DL CCs and 1 UL CC, DL-UL linkage in which the DL CCs correspond to the UL CCs in the ratio of 2:1 can be configured. A DL CC/UL CC link can be fixed or semi-statically configured in the system. Even if the system bandwidth is configured with N CCs, a frequency band that a specific UE can monitor/receive can be limited to M (<N) CCs. Various parameters with respect to CA can be set cell-specifically, UE-group-specifically, or UE-specifically. Control information may be transmitted/received only through a specific CC. For example, a DL control channel for transmitting system and common control information and a UL control channel for transmitting UCI (such as ACK, CSI, etc.) of DL data may be transmitted/received only through a specific CC. This specific CC can be referred to as a primary CC (PCC) and other CCs can be referred to as secondary CCs (SCCs).

LTE-A uses the concept of a cell so as to manage radio resources. The cell is defined as a combination of DL resources and UL resources. Here, the UL resources are not an essential part. Accordingly, the cell can be configured using DL resources only, or DL resources and UL resources. When carrier aggregation (CA) is supported, the linkage between a carrier frequency (or DL CC) of a DL resource and a carrier frequency (or UL CC) of a UL resource can be designated by system information. A cell operating at a primary frequency (or PCC) can be referred to as a Primary Cell (PCell) and a cell operating at a secondary frequency (or SCC) can be referred to as a Secondary Cell (SCell). The PCell is used for a UE to perform an initial connection establishment procedure or a connection re-establishment procedure. The PCell may also refer to a cell configured to operate not only in UL CC through which a control signal is transmitted but also in DL CC linked to SIB2. The PCell may refer to a cell designated during a handover procedure. The SCell can be configured after RRC connection is established and used to provide additional radio resources. The PCell and the SCell can be called a serving cell. Accordingly, for a UE that does not support carrier aggregation (CA) while in an RRC_connected state, only one serving cell configured with a PCell exists. Conversely, for a UE that is in an RRC_Connected state and supports carrier aggregation (CA), one or more serving cells including a PCell and a SCell are provided. For carrier aggregation (CA), a network can configure one or more SCells for a UE that supports carrier aggregation (CA) in addition to a PCell initially configured during a connection establishment procedure after an initial security activation procedure.

Figure 9:
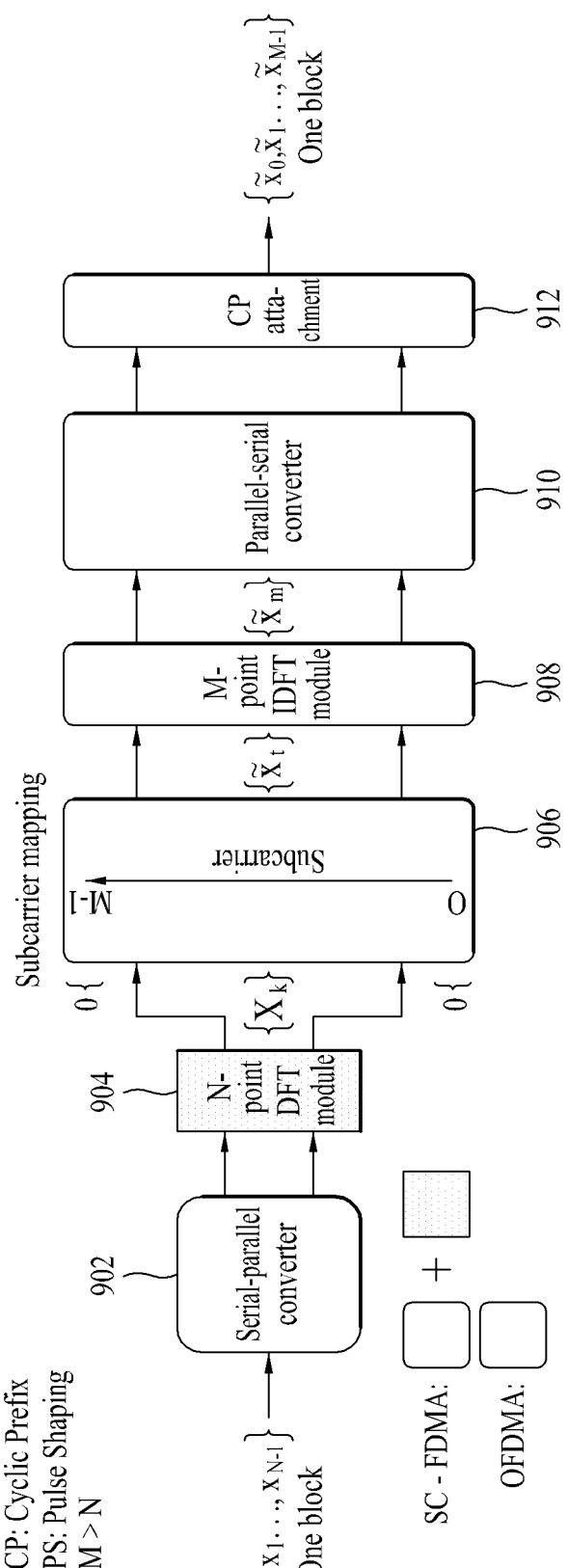
FIG. 9 is a diagram showing SC-FDMA scheme and OFDM scheme.

FIG. 9 illustrates scheduling when a plurality of carriers is aggregated. It is assumed that 3 DL CCs are aggregated and DL CC A is set to a PDCCH monitoring DL CC. DL CC A, DL CC B and DL CC C can be called serving CCs, serving carriers, serving cells, etc. In case of CIF disabled, each DL CC can transmit only a PDCCH that schedules a PDSCH corresponding to the DL CC without a CIF (i.e., non-cross-CC scheduling). When the CIF is enabled according to UE-specific (or UE-group-specific or cell-specific) higher layer signaling, each DL CC n can transmit not only a PDCCH that schedules the PDSCH corresponding to the DL CC A using a CIF, but also PDCCHs that schedule PDSCHs of other DL CCs. (i.e., cross-CC scheduling). In contrast, DL CC B and DL CC C do not deliver PDCCHs.

In the case of the cross-CC scheduling, a DL/UL grant PDCCH for scheduling DL/UL data transmitted/received to/from a specific CC (i.e., SCC) and ACK/NACK information regarding UL data may be transmitted/received only through a specific CC. The specific CC (or cell) is referred to as a scheduling CC (or cell) or a monitoring CC (MCC) (or cell). In contrast, CC (or cell) in which PDSCH/PUSCH are scheduled by a PDCCH of another CC is referred to as a scheduled CC (or cell). One or more MCCs may be assigned to one UE. MCC includes a PCC. If there is only one scheduling CC, the scheduling CC may be equivalent to the PCC. For convenience of description and better understanding of the present invention, it is assumed that MCC (e.g., PCC) and SCC be cross-CC scheduled to each other, and one or more SCC be cross-CC scheduled with a specific one MCC.

When cross-CC scheduling is set, CCs carrying signals are defined according to signal type as follows.

PDCCH (UL/DL grant): MCC
PDSCH/PUSCH: CC indicated by a CIF of a PDCCH, detected from a scheduling CC
DL ACK/NACK (e.g., PHICH): MCC (e.g. DL PCC)
UCI (e.g., UL ACK/NACK) (PUCCH): UL PCC FIG. 9 is a conceptual diagram illustrating an SC-FDMA scheme and an OFDMA scheme applicable to embodiments of the present invention. In the 3GPP LTE(-A) system, the OFDMA scheme is used in downlink and the SC-FDMA scheme is used in uplink. A signal transmission chain of FIG. 9 is independently applied to each CC.

Referring to FIG. 9, not only a UE for uplink signal transmission but also a BS for downlink signal transmission includes a Serial-to-Parallel converter 902, a subcarrier mapper 906, an M-point Inverse Discrete Fourier Transform (IDFT) module 908, a Parallel-to-Serial converter 910, and a Cyclic Prefix (CP) addition module 912. However, a UE for transmitting a signal using the SC-FDMA scheme further includes an N-point DFT module 904. The N-point DFT module 904 compensates for a predetermined part of IDFT processing influence of the M-point IDFT module 908 so that a transmission signal can have single carrier characteristics (i.e., single-carrier properties).

Embodiment

Basically, a communication system performs communication using its own licensed band. As the shortage of frequency resources becomes serious, user interest in a technology for utilizing the unlicensed band is rapidly increasing. The present invention will disclose a method for constructing SCC (or SCell) using an unlicensed band or some resources of a licensed band of another system. For example, PCC/MCC is allocated to the LTE-A licensed band, and the SCC may be allocated to an unlicensed band or a licensed band of another system.

Figure 10:
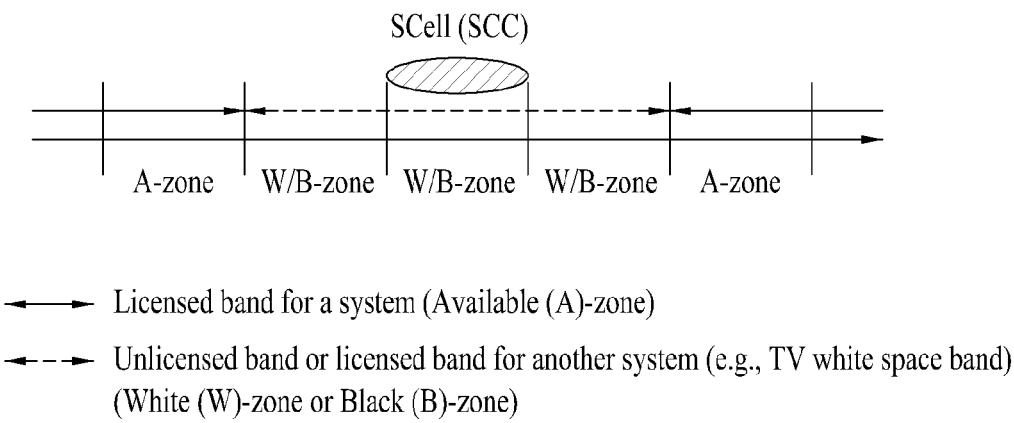
FIGS. 10~11 are diagrams showing the case in which SSC (or SCell) resources are allocated in an unlicensed band or in a licensed band of other system.
Figure 11:
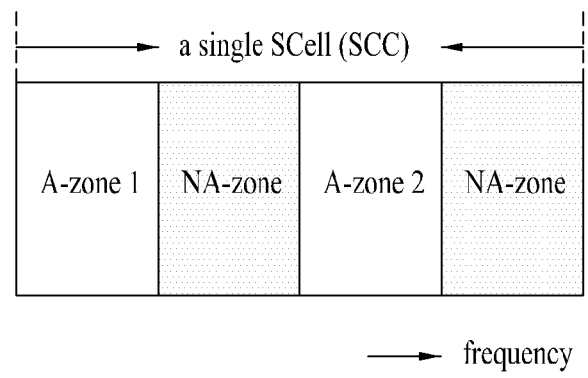

FIGS. 10 and 11 illustrate examples in which SCC (or SCell) resources are allocated to an unlicensed band or a licensed band of another system. Referring to FIG. 10, SCC may be allocated to a specific frequency zone available to an unlicensed band (i.e., a specific frequency zone not occupied by another system), or SCC may be allocated to a specific frequency zone (not used by the licensed user) available to a specific licensed band (e.g., TV whitespace band). The available frequency zone of the unlicensed band may be obtained through the carrier sensing process. In addition, the available frequency zone of the specific licensed band may be obtained through searching for a database (DB) of the licensed user of the corresponding system. In this case, the available frequency zone is defined as a white zone (W-zone) and the unavailable frequency zone is defined as a block zone (B-zone).

FIG. 10 shows an exemplary case in which one W-zone is allocated to one SCC. FIG. 11 shows an exemplary case in which multiple frequency zones (i.e., zones) contained either the unlicensed band or the licensed band of another system are allocated to one SCC. In this case, W-zone or B-zone may be present in one SCC, or W-zone or B-zone may be simultaneously present in one SCC as necessary. The base station (BS) may measure/recognize W-zone and B-zone associated information contained in the CA target band through carrier sensing or database (DB) searching. The W-zone or B-zone may be time-variant according to a user state of the corresponding system. Therefore, multiple W-zones may be consecutively or non-consecutively arranged on a frequency domain of the corresponding SCC according to time. That is, a frequency zone (i.e., an available-zone, A-zone) and another frequency domain (i.e., not available-zone, NA-zone) may coexist in one SCC. In the A-zone, transmission/reception of PDSCH/PUSCH, CRS/CSI-RS reception, and SRS transmission are allowed. In the NA-zone, transmission/reception of PDSCH/PUSCH, CRS/CSI-RS reception, SRS transmission, etc. are disallowed to prevent the occurrence of interference applied to another system or licensed user). The A-zone includes the licensed band and the W-zone of the 3GPP system. The NA-zone includes a B-zone. If a guard band is contained in the W-zone, the A-zone may indicate the remaining frequency resources obtained when the guard band is excluded from the W-zone.

Meanwhile, if one SCC is comprised of multiple frequency zones, the same processes (e.g., HARQ combining caused by PDSCH/PUSCH transmission/reception), SCI reporting caused by CSI/CS-RS reception, and Radio Resource Management (RRM) measurement caused by CSI/CSI-RS reception, SRS transmission, etc.) are applied to the plurality of frequency zones, such that a communication method, signal processing for the communication method, and signal Tx/Rx processes may cause unexpected problems. If the A-zone and the NA-zone coexist in one SCC, the BS may prevent either interference from being generated from the NA-zone or interference from being applied to the NA zone through appropriate resource allocation with respect to at least PDSCH/PUSCH transmission/reception. However, in the case of various kinds of measurements including a CSI feedback and/or RRM (i.e., if there is no separate indication for a zone state), the range of measurement report is extended to the NA zone to which CRS/CSI-RS is not transmitted, resulting in execution of the meaningless measurement report. In addition, SRS transmission is achieved within the NA-zone (under the condition that there is no separate indication for a zone status), such that the SRS transmission may cause interference to either another system or the licensed user of the another system. In addition, as shown in FIG. 10, although one W-zone is allocated to one SCC, an emission/interference permission level related to a contiguous frequency band may be changeable according to whether the zone contiguous to the corresponding SCC is a W-zone or B-zone. Therefore, the usable band (i.e., A-zone) of one W-zone and the guard band region (i.e., NA-zone) may be changeable according to a contiguous zone status.

Zone Configuration Information and Associated Operation

In order to solve the above-mentioned problems, the present invention additionally proposes a method for enabling the BS and the UE to share configuration information of the A-zone (and/or NA-zone) contained in SCC under the CA situation of FIGS. 10 and 11.

Figure 12:
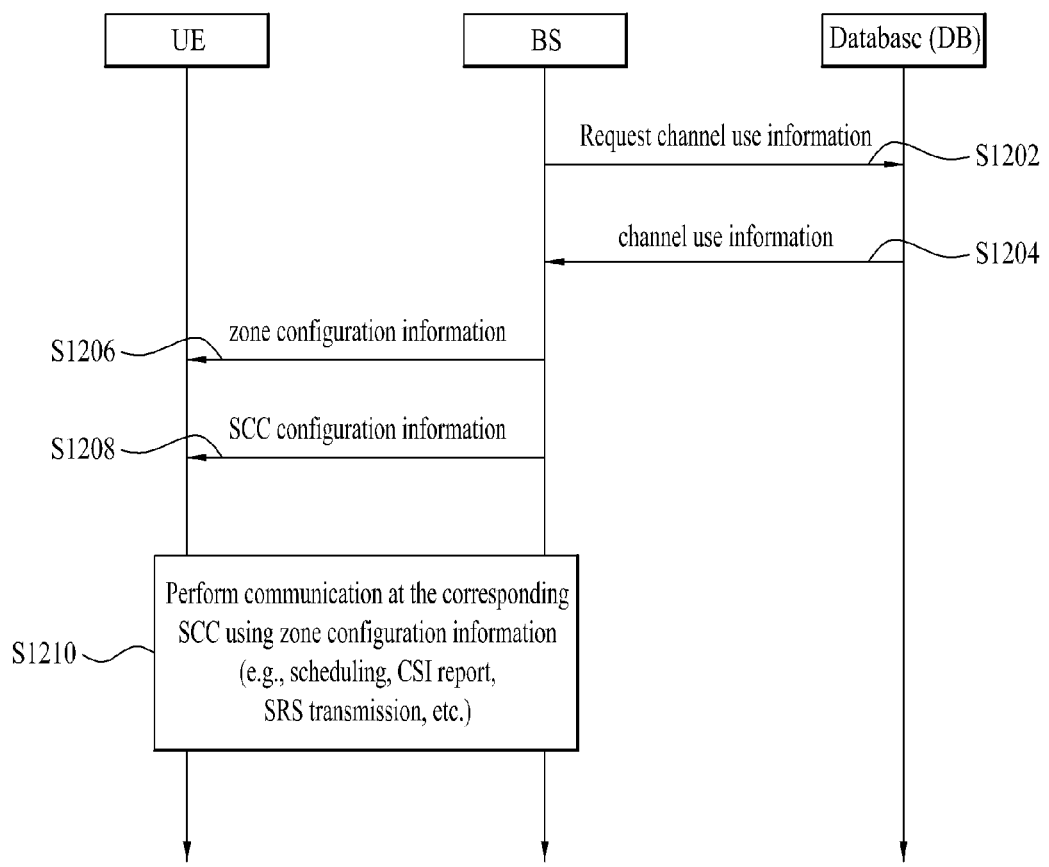
FIG. 12 is a diagram showing a method of providing zone configuration information for SCC according to another embodiment of the present invention.

FIG. 12 is a conceptual diagram illustrating a method for transmitting/receiving signals according to one embodiment.

Referring to FIG. 12, the 3GPP base station (BS) may transmit a channel information request message to a database server in step S1292. Here, the DB server may store and manage channel use (status) information obtained when the licensed user of the corresponding system uses the channel within a specific licensed band. Accordingly, the DB server receives the channel information request message from the 3GPP BS, channel use information of the specific licensed band may be provided to the 3GPP BS in step S1204. Here, the channel use information (or CSI) may include an available frequency band, an unavailable frequency band, a time period in which the above information is valid. Although not shown in FIG. 12, channel use information (or CSI) of the unlicensed band may be confirmed through carrier sensing.

After the BS confirms the channel use state of a specific licensed band on the basis of information received from the DB server, the BS may provide zone configuration information to the UE in step S1206. The zone configuration information may be updated/provided either at intervals of a predetermined time or according to the event-based scheme through carrier sensing or database (DB) searching. The zone configuration information may include information required for identifying the A-zone and the NA-zone. For example, the zone configuration information may include frequency information constructing the A-zone and/or the NA-zone, and information regarding a subframe or time period to which the A-zone and/or the NA-zone may be applied. The zone configuration information may be applied in different ways according to associated signals. For example, A-zone and the NA-zone according to the zone configuration information may be applied, or may be applied only to a specific signal (e.g., CRS/CSI-RS reception and SRS transmission). Specifically, in the case of the A-zone information related to CRS/CSI-RS reception and SRS transmission, a method for indicating not only a subframe or time period (i.e., A-zone (or A-zone group)) in which CRS/CSI-RS reception and SRS transmission are possible per A-zone or (per A-zone group), but also another method for indicating CRS/CSI-RS/SRS configuration per time period (i.e., per A-zone (or per A-zone group)) may be considered by the present invention. In this case, zone configuration information may be signaled from the BS to the UE through PCC/MCC. In addition, zone configuration information may be transferred to the UE through broadcast signaling or RRC signaling/L1 (Layer 1) signaling (e.g., PDCCH)/L2 signaling (e.g., MAC signaling).

Simultaneously with the step S1206, or before/after the step S1206, the BS may transmit SCC (or SCell) configuration information to the UE, such that SCC may be added to the UE in step S1208. In this case, SCC may include frequency resources of the unlicensed band or at least some frequency resources of the licensed band of another system. If step S1206 and step S1208 are simultaneously carried out, at least some parts of the zone configuration information of the step S1206 may be included as some parts of the SCC configuration information of the step S1208. Thereafter, the BS and the UE may perform a communication process (e.g., scheduling, CSI report, SRS transmission, etc) related to the corresponding SCC using the zone configuration information in step S1210.

Hereinafter, a method for enabling the UE and the BS to perform communication using zone configuration information will be described in detail.

Signal Transmission Chain

Figure 13:
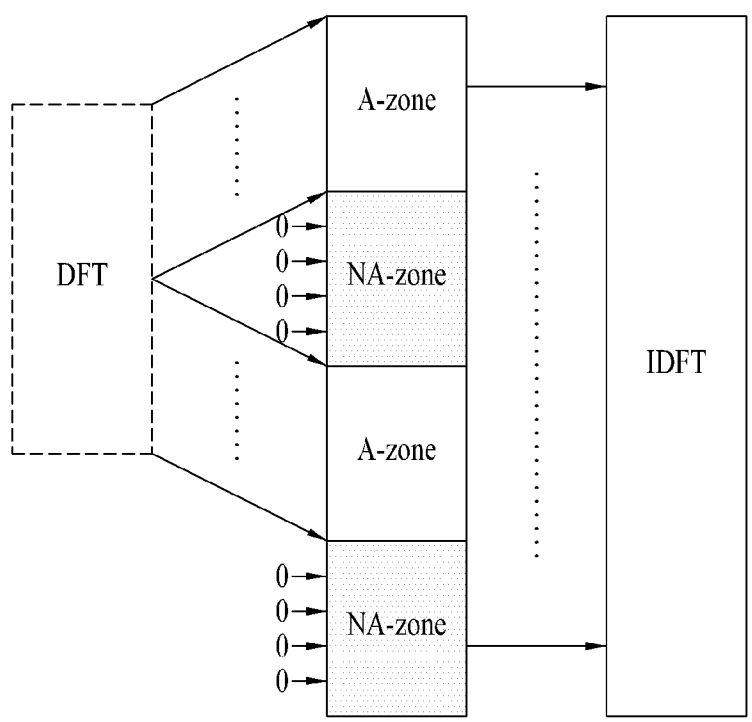
FIG. 13 is a diagram showing a transmission signal process according to another embodiment of the present invention.

FIG. 13 exemplarily shows a signal transmission chain when SCC includes the NA-zone. FIG. 13 may correspond to the constituent elements 904 to 908 of FIG. 9. As described above, the signal transmission chain of FIG. 9 is independently applied to each CC. Accordingly, as shown in FIG. 13, if SCC includes the NA-zone, actual transmission information (e.g., complex symbol sequence) may be mapped to a subcarrier corresponding to the A-zone, and a null value (e.g., zero '0') may be mapped to a subcarrier corresponding to the NA-zone. In this case, the DFT I/O size (briefly, DFT size) may correspond to the entire A-zone band of SCC. The presence/size of the A-zone/NA-zone may be changed when zone configuration information is updated through carrier sensing or DB searching, such that the DFT size may also be changeable according to the changed result.

SRS Transmission Process

Figure 14A:
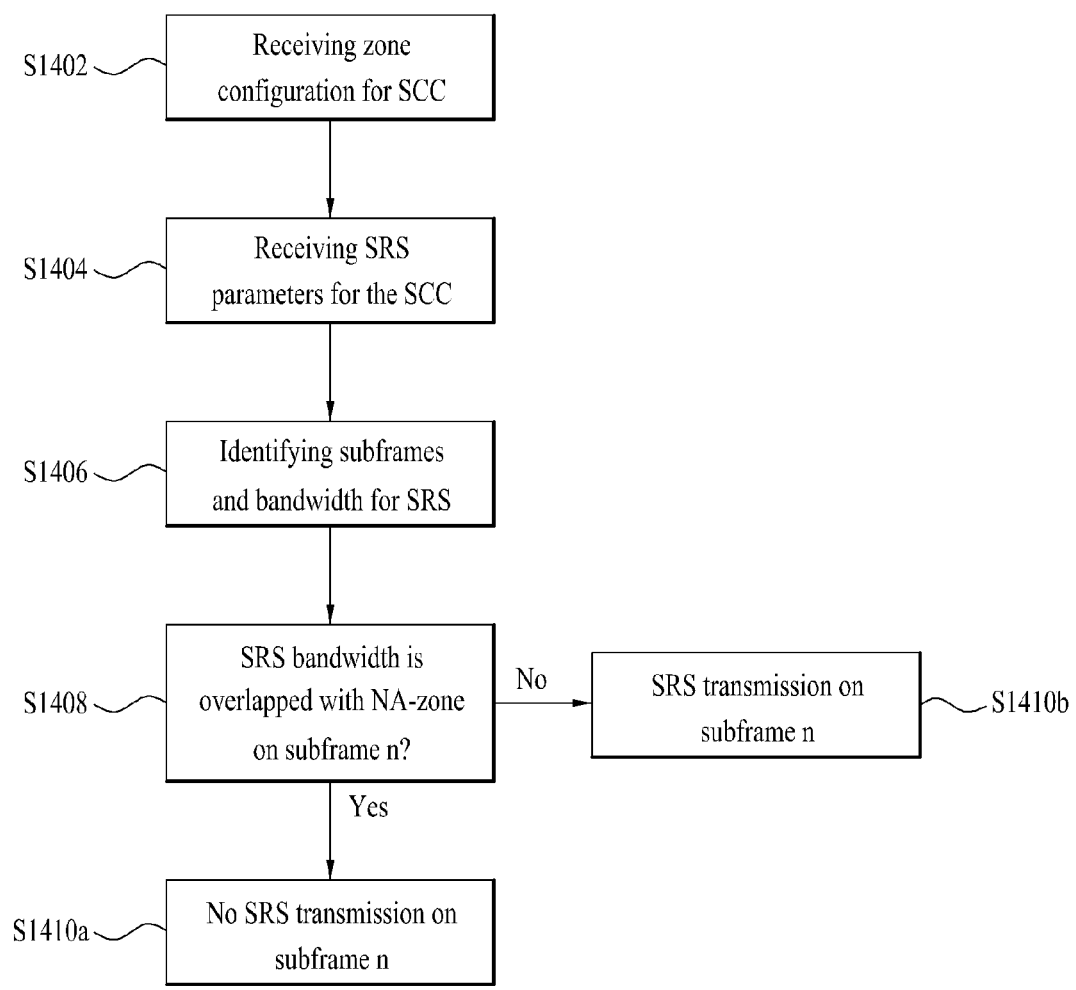
FIGS. 14A~14B are diagrams showing a SRS transmission process according to another embodiment of the present invention.
Figure 14B:
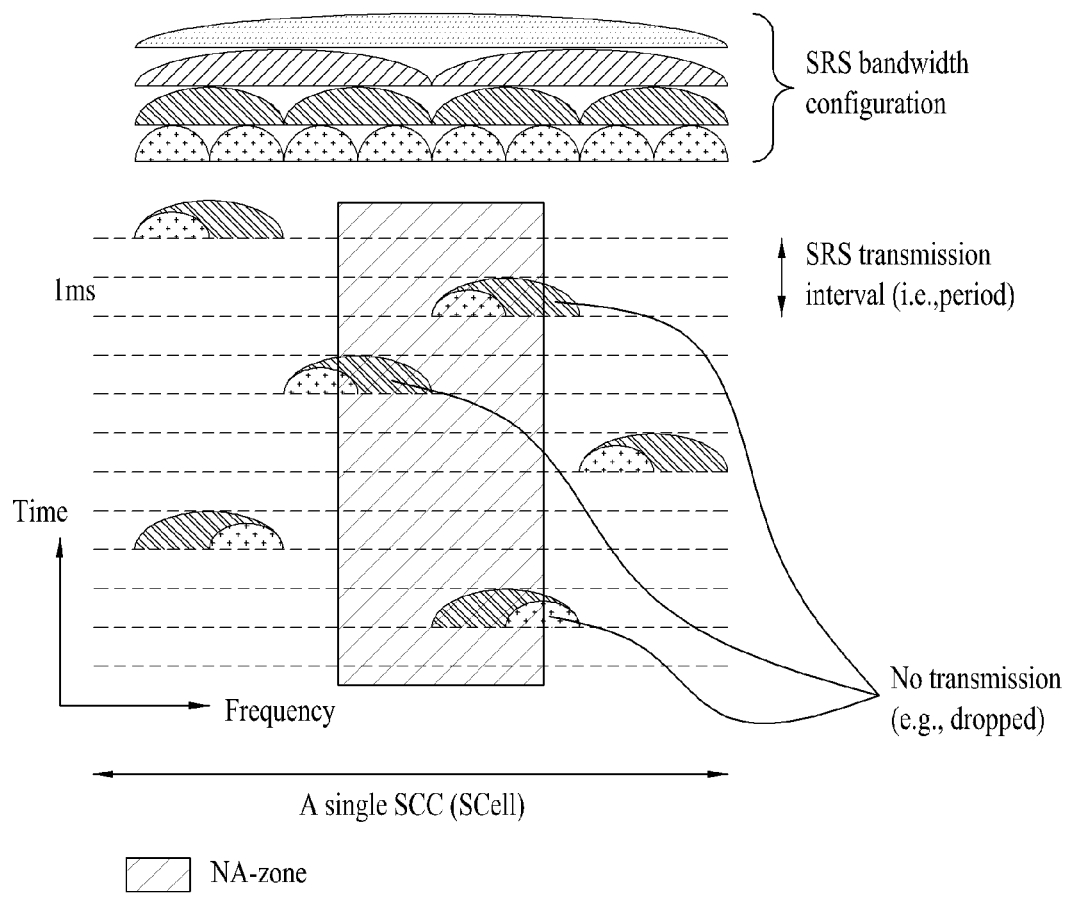

FIGS. 14A and 14B exemplarily show the SRS transmission process when SCC includes the NA-zone. The example of FIGS. 14 and 14B shows that the entire SCC region (e.g., FIG. 11: A-zone #1+NA-zone+A-zone #2+NA-zone) is considered an SCC band for SRS transmission.

Referring to FIG. 14A, the UE receives zone configuration information of the SCC from the BS in step S1402. It is assumed that the SCC includes at least one A-zone and at least one NA-zone according to the zone configuration information. In addition, the UE receives an SRS parameter for the SCC from the BS in step S1404. The SRS parameter includes a cell-specific parameter and a UE-specific SRS parameter. Thereafter, the UE confirms a subframe and SRS band configured for SRS transmission in step S1406. The SRS band may be hopped per SRS transmission time point as shown in FIG. 5B. For convenience of description, a subframe in which SRS transmission is scheduled is denoted by a subframe 'n'. If the NA-zone is present in SCC, the UE determines whether the SRS band overlaps the NA-zone at the subframe (n) in step S1408. If the SRS band slightly overlaps the NA-zone, the UE may discard SRS transmission at the subframe (n) (e.g., SRS transmission drop) in step S1410a. In contrast, if the SRS band does not overlap the NA-zone, the UE may normally perform SRS transmission at the subframe (n) in step S1410b.

FIG. 14B shows an SRS transmission process based on the concept of FIG. 14A. Referring to FIG. 14B, the UE may perform a process for transmitting the SRS at intervals of a predetermined time (2 ms). However, if the SRS band overlaps the NA-zone at the SRS transmission time point, the SRS is not transmitted at the corresponding time point (i.e., the SRS is dropped at the corresponding time point). Dropping of the SRS transmission may be achieved in the channel resource allocation process and the resource mapping process.

Although not shown in FIG. 14B, the BS and the UE may determine only the A-zone (e.g., FIG. 11: A-zone #1+A-zone #2) contained in SCC to be the SCC band for SRS transmission, and then operate. In this case, the BS and the UE may consider only a specific region in which one or more A-zones are concatenated to be the SRS hopping region, and then perform SRS transmission. As a result, differently from FIGS. 14A and 14B, the SRS can be periodically transmitted without additional SRS dropping. However, if the SRS band is extended to a boundary in which several A-zones are concatenated, the SRS signal may be divided into two non-consecutive A-zones (e.g., FIG. 11: A-zone#1 and A-zone #2). In this case, PAPR (Peak to Average Power Ratio) signal characteristics are deteriorated, such that correct UL channel information may not be provided. Accordingly, if the SRS band overlaps the boundary in which several A-zones are concatenated, RS transmission may be dropped at the corresponding subframe. In addition, the SRS hopping rule may be limited such that the SRS band is prevented from overlapping the boundary in which several A-zones are concatenated.

Alternatively, as described above, independent SRS configuration is allocated to each A-zone (or A-zone group) and a method for performing SSRS transmission may be used as necessary. Preferably, the above SRS configuration may be constructed in a manner that an SRS transmission time point between the A-zones (or A-zone groups) is time-division-multiplexed (TDM)-processed and thus the SRS transmission time points are not overlapped with each other.

Channel Measurement and CSI Feedback

Figure 15:
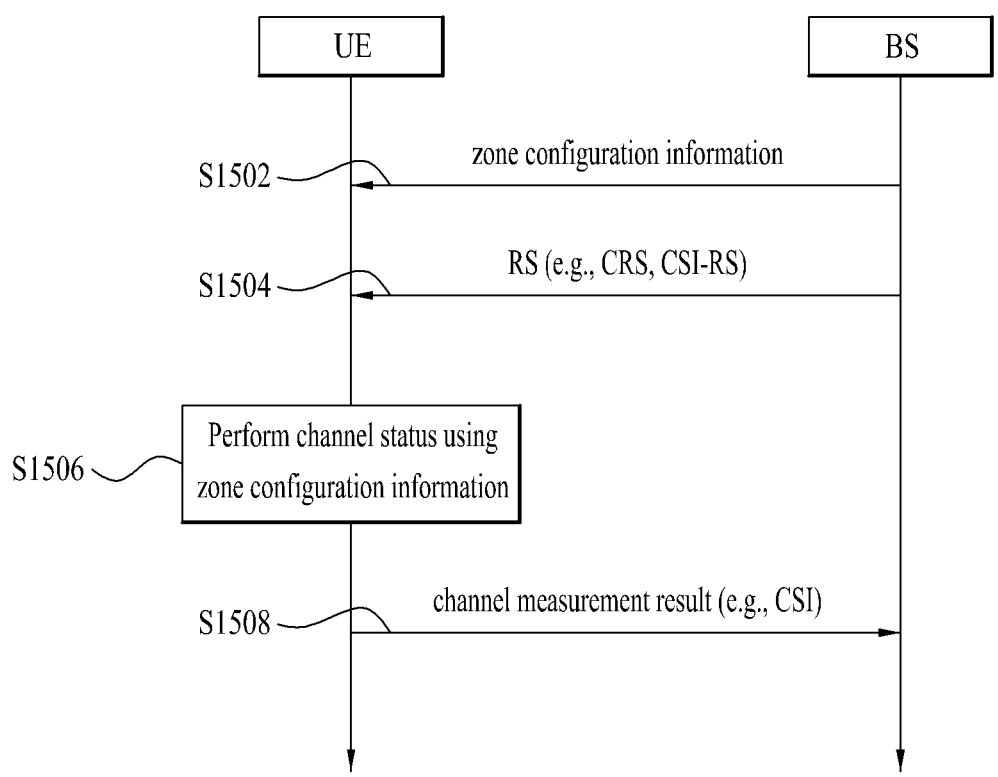
FIG. 15 is a diagram showing a CSI reporting process according to another embodiment of the present invention.

FIG. 15 is a flowchart illustrating a CSI transmission process when SCC includes the NA-zone.

Referring to FIG. 15, the UE receives zone configuration information of the SCC from the BS in step S1502. The SCC includes at least one A-zone and at least one NA-zone according to the zone configuration information. In this case, SCC-associated zone configuration information may relate to an SCC through which the UE can receive necessary services from the BS, or may relate to a neighbor SCC, channel measurement of which is required. Thereafter, the UE may receive an RS on the corresponding SCC in step S1504. The scope of the present invention is not limited thereto, and the RS may include other information (e.g., CRS, CSI-RS) as necessary. Thereafter, the UE may measure a channel status of the corresponding SCC using the zone configuration information and the received RS in step S1506. In more detail, the UE having received the zone configuration information may perform channel measurement of CRS/CSI-RS of each A-zone or each A-zone group. In this case, the A-zone group includes one or more A-zones. Preferably, the A-zone group may be comprised of a plurality of A-zones contiguous to each other. Thereafter, the UE may report the channel measurement result (e.g., CSI) of the corresponding SCC to the BS in step S1508. The channel measurement result may be carried out per A-zone or per A-zone group. In addition, the channel measurement results of all A-zones or all A-zone groups may be aggregated and then reported. Here, cell index information of the corresponding SCC may directly or indirectly include the channel measurement result.

Resource Index Configuration and Resource Allocation

Figure 16:
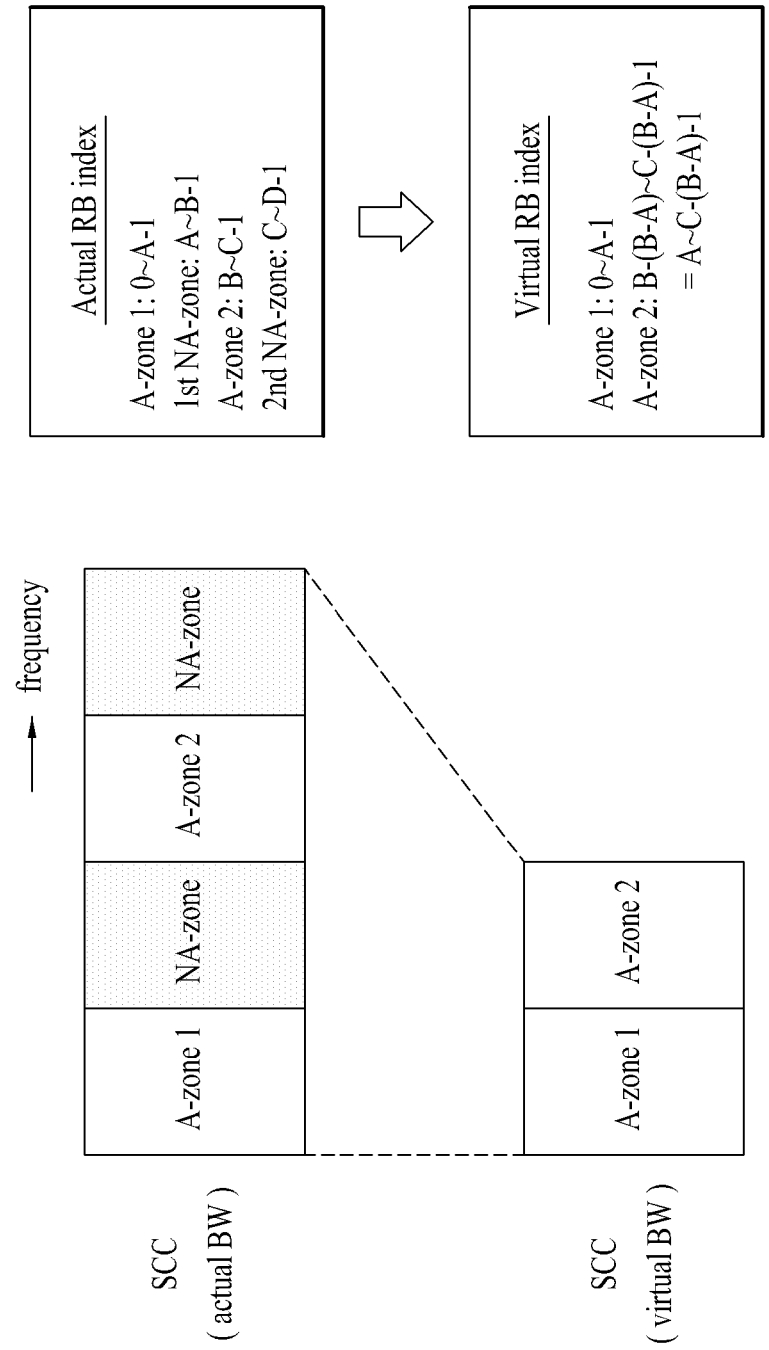
FIG. 16 is a diagram showing a resource indexing and a resource allocation according to another embodiment of the present invention.

FIG. 16 shows a resource index configuration and a resource allocation method when SCC includes the NA-zone. First, the BS and the UE may consider the entire SCC region (e.g., FIG. 11: A-zone #1+NA-zone+A-zone #2+NA-zone) as an SCC band for resource allocation, and then operate. Accordingly, as shown in FIG. 16, the actual RB index may be used for the corresponding SCC without change. In this case, the BS and the UE may exclude resources allocated to the NA-zone when PDSCH/PUSCH transmission/reception is achieved according to the zone configuration information. In contrast, the BS and the UE may consider only the A-zone region (e.g., FIG. 11: A-zone #1 +A-zone #2) contained in SCC as the SCC band for resource allocation, and then operate. For this purpose, a virtual RB index composed of only the A-zone(s) with respect to the corresponding SCC may be used. Here, PDSCH/PUSCH resources may be allocated only to a specific region (i.e., a virtual band) in which all A-zones (other than the NA-zone) are concatenated.

Table 2 shows the size of RB allocation field included in a DL grant DCI format of the legacy LTE, and Table 3 shows the size of RB allocation field included in UL DCI format. As can be seen from Tables 2 and 3, the size of RB allocation field is dependent upon DL and UL bands. Tables 2 and 3 correspond to the case in which a single CC is constructed.

TABLE 2

| DL RA method | Description | Number of necessary bits |
|---|---|---|
| Type 0: bitmap | Bitmap indicates RBG. RBG size is based on a system band. | $\lceil N_{RB}^{DL}/P \rceil$ |
| Type 1: bitmap | Bitmap indicates RBs within an RBG subset.. The number of subsets is dependent upon a system band. The number of bits is established in the same manner as in Type 0. Therefore, the same DCI format is used to carry Type 0 or Type 1 information. | $\lceil N_{RB}^{DL}/P \rceil$ |
| Type 2: contiguous allocation | This indicates a start position of a resource block and the number of contiguous resource blocks. | $\lceil \log_2(N_{RB}^{DL}(N_{RB}^{DL} + 1)/2) \rceil$ |

TABLE 3

| UL RA method | Description | Number of necessary bits |
|---|---|---|
| Contiguous allocation | This indicates a start position of a resource block and the number of contiguous resource blocks. | $\lceil \log_2(N_{RB}^{UL}(N_{RB}^{UL} + 1)/2) \rceil$ |

In Tables 2 and 3, $N_{RB}^{DL}$ is a downlink bandwidth denoted by a multiple of $N_{sc}^{RB}$. That is, $N_{RB}^{DL}$ is a downlink bandwidth in units of an RB. Similarly, $N_{RB}^{UL}$ is an uplink bandwidth denoted by a multiple of $N_{sc}^{RB}$. That is, $N_{RB}^{UL}$ is an uplink bandwidth in units of an RB. P is the number of RBs contained in an RBG.

In accordance with the above-mentioned example, when the actual RB index is used for the corresponding SCC without change, in Tables 2 and 3, $N_{RB}^{DL}$ is replaced with a DL band of SCC, and $N_{RB}^{UL}$ is replaced with a UL band of SCC. In this case, the present invention may construct DL/UL grant DCI formats in the same manner as in the legacy LTE. In contrast, when using a virtual RB index for the corresponding SCC, it is possible to use DL/UL grant DCI formats supporting the corresponding virtual band instead of the entire SCC band. In other words, assuming that only the A-zone region (e.g., FIG. 11: A-zone #1+A-zone #2) contained in SCC is considered an SCC band for resource allocation, $N_{RB}^{UL}$ of Tables 2 and 3 is replaced with a DL A-zone region, and $N_{RB}^{UL}$ is replaced with a UL A-zone band. In this case, the size of resource allocation field of DL/UL grant DCI format is adaptively changed according to the A-zone band, such that control channel resources can be efficiently used.

Figure 17:
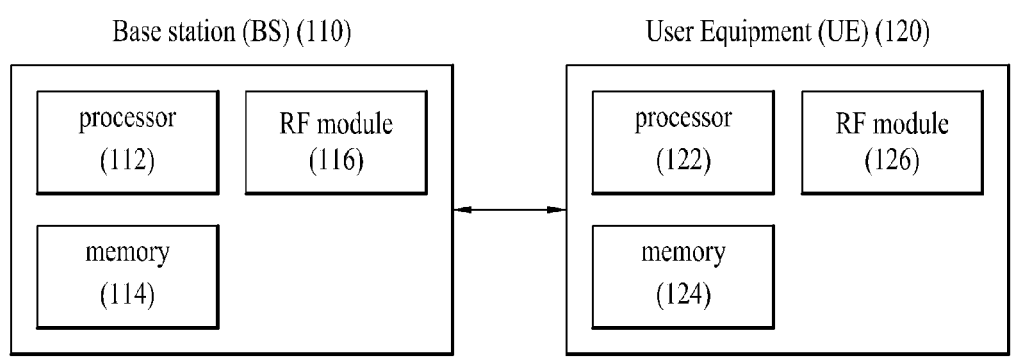
FIG. 17 is a diagram showing a base station and a UE to which the present invention is applicable.

FIG. 17 illustrates a Base Station (BS) and a UE (User Equipment) applicable to an embodiment of the present invention. In case of a wireless communication system including a relay, communication is performed between a BS and the relay in a backhaul link and between the relay and a UE in an access link. Accordingly, the BS or UE can be replaced by a relay as necessary.

Referring to FIG. 17, an RF communication system includes a BS 110 and a UE 120. The BS 110 includes a processor 112, a memory 114 and an RF unit 116. The processor 112 may be configured to implement the procedures and/or methods proposed by the present invention. The memory 114 is connected to the processor 112 and stores various types of information relating to operations of the processor 112. The RF unit 116 is connected to the processor 112 and transmits and/or receives RF signals. The UE 120 includes a processor 122, a memory 124 and an RF unit 126. The processor 122 may be configured to implement the procedures and/or methods proposed by the present invention. The memory 124 is connected to the processor 122 and stores various types of information relating to operations of the processor 122. The RF unit 126 is connected to the processor 122 and transmits and/or receives RF signals. The BS 110 and the UE 120 may have a single antenna or multiple antennas.

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by subsequent amendment after the application is filed.

In the embodiments of the present invention, a specific operation described as performed by the BS may be performed by an upper node of the BS. Namely, it is apparent that, in a network comprised of a plurality of network nodes including a BS, various operations performed for communication with an MS may be performed by the BS, or network nodes other than the BS. The term 'BS' may be replaced with the term 'eNB', 'fixed station', 'Node B', 'Base Station', 'access point', etc.

The embodiments of the present invention may be achieved by various means, for example, hardware, firmware, software, or a combination thereof. In a hardware configuration, the methods according to the embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the embodiments of the present invention may be implemented in the form of a module, a procedure, a function, etc. For example, software code may be stored in a memory unit and executed by a processor. The memory unit is located at the interior or exterior of the processor and may transmit and receive data to and from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

The present invention may be used for a terminal, a base station or other equipment of a wireless mobile communication system. More specifically, the present invention is applicable to a method and device for controlling inter-cell interference.

The invention claimed is:

1. A method for performing a communication on a specific single secondary cell (SCell) in a wireless communication system supporting carrier aggregation (CA), the method comprising:

receiving configuration information of multiple frequency zones constructing the specific single SCell, wherein a primary cell (PCell) is allocated to a licensed band and the specific single SCell is allocated to an unlicensed band, wherein the configuration information indicates one or more available frequency zones and zero or more unavailable frequency zones included in the multiple frequency zones, and wherein the one or more available frequency zones and the zero or more unavailable frequency zones are determined based on a frequency occupation of another system; and performing the communication on the specific single SCell, wherein the configuration information is applied only to a reference signal transmission for the communication, and wherein the reference signal transmission for the communication is dropped when a band of the reference signal transmission is overlapped with an unavailable frequency zone on the specific single SCell based on the configuration information.

2. The method according to claim 1, wherein the unlicensed band includes a TV whitespace band.

3. The method according to claim 1, wherein the wireless communication system is a 3rd Generation Partnership Project (3GPP) wireless communication system.

4. The method according to claim 1, wherein the multiple frequency zones constructing the specific single SCell are configured to operate on a specific frequency range.

5. The method according to claim 1, wherein the multiple frequency zones constructing the specific single SCell are processed using at least one of a single Discrete Fourier Transform (DFT) process and a single Inverse Discrete Fourier Transform (IDFT) process.

6. A communication device configured to perform a communication on a specific single secondary cell (SCell) in a wireless communication system supporting carrier aggregation (CA), the communication device comprising:

a radio frequency (RF) unit; and a processor configured to:

control the RF unit to receive configuration information of multiple frequency zones constructing the specific single SCell, wherein a primary cell (PCell) is allocated to a licensed band and the specific single SCell is allocated to an unlicensed band, wherein the configuration information indicates one or more available frequency zones and zero or more unavailable frequency zones included in the multiple frequency zones, and wherein the one or more available frequency zones and the zero or more unavailable frequency zones are determined based on a frequency occupation of another system, and control the RF unit to perform the communication on the specific single SCell, wherein the configuration information is applied only to a reference signal transmission for the communication, and wherein the reference signal transmission for the communication is dropped when a band of the reference signal transmission is overlapped with an unavailable frequency zone on the specific single SCell based on the configuration information.

7. The communication device according to claim 6, wherein the unlicensed band includes a TV whitespace band.

8. The communication device according to claim 6, wherein the wireless communication system is a 3rd Generation Partnership Project (3GPP) wireless communication system.

9. The communication device according to claim 6, wherein the multiple frequency zones constructing the specific single SCell are configured to operate on a specific frequency range.

10. The communication device according to claim 6, wherein the multiple frequency zones constructing the specific single SCell are processed using at least one of a single Discrete Fourier Transform (DFT) process and a single Inverse Discrete Fourier Transform (IDFT) process.

* * * * *